(12) United States Patent
Sica

(10) Patent No.: US 6,254,318 B1
(45) Date of Patent: Jul. 3, 2001

(54) APPARATUS FOR MAKING NUMEROUS HOLES IN A TUBE

(76) Inventor: Michael F. Sica, 261 Round Hill Rd., Greenwich, CT (US) 06831

(*) Notice: Subject to any disclaimer, the term of this patent is extended or adjusted under 35 U.S.C. 154(b) by 0 days.

(21) Appl. No.: 09/385,275

(22) Filed: Aug. 30, 1999

Related U.S. Application Data

(63) Continuation-in-part of application No. 09/212,914, filed on Dec. 16, 1998, now abandoned.

(51) Int. Cl.$^7$ .................................................. B23B 39/22
(52) U.S. Cl. ........................... 408/39; 408/53; 408/89; 408/103
(58) Field of Search .................................. 408/37, 39, 41, 408/53, 89, 103

(56) References Cited

U.S. PATENT DOCUMENTS

| | | | |
|---|---|---|---|
| 272,857 | * | 2/1883 | Coffin ........................................ 408/39 |
| 391,345 | * | 10/1888 | Stites ........................................ 408/89 |
| 1,854,053 | * | 4/1932 | Millspaugh ............................ 408/1 R |
| 2,135,696 | | 11/1938 | Baumhauer et al. . |
| 2,363,109 | | 11/1944 | Keiffer . |
| 2,581,959 | | 1/1952 | Koehler . |
| 2,877,670 | * | 3/1959 | Allen ........................................ 408/39 |
| 3,358,167 | | 12/1967 | Shanks . |
| 3,453,470 | | 7/1969 | Hammer . |
| 3,602,759 | | 8/1971 | Evans . |
| 3,635,570 | * | 1/1972 | DeGelleke et al. ..................... 408/43 |
| 3,720,826 | | 3/1973 | Gilmore et al. . |
| 3,808,495 | | 4/1974 | Win . |
| 3,833,312 | | 9/1974 | Miles et al. . |
| 3,955,896 | | 5/1976 | Davis . |
| 3,957,386 | | 5/1976 | Lupke . |
| 4,048,537 | | 9/1977 | Blaisdell et al. . |
| 4,162,134 | | 7/1979 | Kitagawa . |
| 4,268,196 | | 5/1981 | Harrow et al. . |
| 4,426,062 | | 1/1984 | Kawamura et al. . |
| 4,493,595 | | 1/1985 | Klein . |
| 4,529,342 | | 7/1985 | Babel . |
| 4,606,686 | | 8/1986 | Weaver . |
| 4,674,925 | | 6/1987 | Thornton et al. . |
| 4,728,229 | | 3/1988 | Memmel et al. . |
| 4,916,352 | | 4/1990 | Haim et al. . |
| 4,924,368 | | 5/1990 | Northrop et al. . |
| 5,173,637 | | 12/1992 | Sica . |
| 5,494,134 | | 2/1996 | McConkey . |
| 5,536,998 | | 7/1996 | Sica . |
| 5,621,964 | | 4/1997 | Susnjara et al. . |
| 5,729,085 | | 3/1998 | Sica et al. . |

FOREIGN PATENT DOCUMENTS

| | | | | |
|---|---|---|---|---|
| 141097 | * | 2/1895 | (FR) | ........................................ 408/39 |
| 4011 | * | of 1876 | (GB) | ........................................ 408/39 |
| 16241 | * | 10/1964 | (JP) | ........................................ 408/37 |
| 2806 | * | 1/1989 | (JP) | ........................................ 408/37 |

\* cited by examiner

*Primary Examiner*—Daniel W. Howell
(74) *Attorney, Agent, or Firm*—Baker Botts L.L.P.

(57) ABSTRACT

Apparatus for making numerous spaced-apart, radial holes in a tube includes a rotary index table that rotates intermittently through predetermined index angles of rotation and dwells between each rotation. A mandrel affixed to the index table receives the tube telescopically and holds the tube in a fixed position relative to the mandrel. A pair of self-feed drilling units mounted on opposite sides of the mandrel have output shafts that are driven intermittently in reciprocating motion along axes lying in a common plane with the longitudinal axis of the tube, the axis of each output shaft being perpendicular to the longitudinal axis of the tube. Each output shaft carries a multiple-spindle head, and each spindle of the multiple-spindle head receives a drill bit.

15 Claims, 2 Drawing Sheets

APPARATUS FOR MAKING NUMEROUS HOLES IN A TUBE

CROSS-REFERENCE TO PRIOR APPLICATION

The present application is a continuation-in-part of U.S. patent application Ser. No. 09/212,914, filed Dec. 16, 1998 now abandoned.

BACKGROUND OF THE INVENTION

Sica U.S. patent application Ser. No. 09/187,950, filed Nov. 6, 1998, and entitled "All-weather Flourescent Lamp With a Protective Assembly" (hereinafter "Sica"), discloses a protective assembly for a standard fluorescent lamp of the type having an elongated glass tube and a metal terminal cap at each end of the glass tube, each cap having a flange portion adjacent the glass tube. The assembly includes a protective tube that is preformed from a semi-rigid non-frangible polymeric transparent or translucent material that is stabilized against ultraviolet radiation and is received over the glass tube with its inner surface substantially uniformly spaced apart from the outer surface of the glass tube to form an air space for insulation of the lamp. The protective tube is substantially coextensive with the full diameter portion of the glass tube lengthwise of the lamp and is securely fastened to the flange portions of the lamp. The protective tube protects the lamp from impacts, thus reducing the possibility of the lamp being accidentally broken. In the event that the lamp does break, the protective tube remains intact and secured to the end caps of the lamp so as to form an enclosure that keeps broken glass fragments, phosphor powders and mercury from escaping to the environment.

The all-weather characteristic of the lamp of Sica is obtained by forming numerous small vent holes in portions of the protective tube proximate to the end caps. The vent holes are of a size such that fragments of glass from a broken lamp tube cannot pass through them. The number of vent holes is such that the air gap between the glass tube of the lamp and the protective tube is vented to permit the lamp to operate without substantial reduction in light output and without substantial discoloration of the protective tube in the range of ambient temperatures of from about 50° F. to −30° F. Sica is incorporated into the present specification for all purposes.

For proper operation of the lamp of Sica—i.e., substantially undiminished light output over the aforementioned broad range from moderately cool to very cold temperatures and prevention of discoloration and other effects of overheating of the lamp near the upper end of the range—it is important that the vent holes be formed within a close tolerance. Variations in the diameters and lengths of the holes may significantly alter the ventilating properties, which can lead to either overcooling and loss of light output at low temperatures or overheating at temperatures near the high end of the desired operating range.

SUMMARY OF THE INVENTION

An object of the present invention is to provide apparatus for producing the vent holes in the protective tube with high precision, thus to ensure proper functioning of the vent holes in all protective tubes produced over long production runs. Another object is to provide apparatus for forming the vent holes that is reliable, relatively inexpensive, easy to use, and efficient.

The foregoing and other objects are attained, according to the present invention, by apparatus for making numerous spaced-apart radially extending holes in a tube that includes a rotary index table that is adapted to be rotated intermittently through predetermined index angles of rotation about a table axis and to dwell between each rotation. A mandrel affixed to the index table is adapted to be received telescopically within an end portion of the tube and hold the tube in a fixed position relative to the mandrel with the axis of the tube coaxial with the table axis. A pair of self-feed drilling units mounted on opposite sides of the mandrel have output shafts that are driven intermittently in reciprocating motion along axes lying in a common plane with the longitudinal axis of the tube, the axis of each output shaft being perpendicular to the longitudinal axis of the tube. Each output shaft carries a multiple-spindle head, each spindle of the multiple-spindle head receiving a drill bit.

The tube in which the holes are to be made is inserted over the mandrel. The drill units cycle and drill multiple longitudinally spaced-apart, radially extending holes in each side of the tube, the holes being diametrically opposite each other. During a dwell period of the drill units at the end of the drilling cycle, the index table rotates through a predetermined angle and stops. While the index table dwells, the drill units cycle again and drill another set of diametrically opposite holes in the tube. The indexing of the tube rotationally and the cycling of the drill units is repeated until the desired number of holes have been drilled in the tube. The apparatus provides holes of the same diameter with a high degree of precision and ensures that all of the holes lie radially with respect to the axis of the tube, which in turn means that the holes are all of the same length—equal to the wall thickness of the tube. Repeatability of the accuracy of the hole sizes is ensured over all production of the tubes, thereby fulfilling the requirement of consistent venting of the all-weather protected fluorescent lamps in which the tubes are used.

In preferred embodiments of the apparatus, the axes of the output shafts of the drilling units are aligned, the number of spindles of the multiple-spindle heads are equal, and the spacings of the spindles of the heads are the same. With that configuration the completed hole set in the tube has longitudinal sets of holes arranged in circumferential rows. Preferably, the machine is set up or controlled to index the tube rotationally through the same index angle, the angle being equal to 360 degrees divided by the number of holes in each circumferential row. The same index angle results in the spacing of the adjacent holes in each circumferential row being equal. For example, if each circumferential row is to have 20 holes, the index angle is set to 18 degrees.

In advantageous embodiments of the invention, the mandrel is adapted to hold the tube in a fixed position relative to the mandrel by means of one or more resilient O-rings that are received in ring-grooves in the mandrel and resiliently engage the inner surface of the tube with an interference fit and to position the tube longitudinally by means of a stop shoulder that is engaged by the end of the tube. The O-ring(s) permits the tube to be inserted over the mandrel relatively easily and securely holds the tube frictionally as it is rotated with the mandrel and index table.

For a better understanding of the invention, reference may be made to the following description of an exemplary embodiment, taken in conjunction with the accompanying drawings.

DESCRIPTION OF THE DRAWINGS

FIG. 4 is a side elevational view of the mandrel of the apparatus shown in FIGS. 2 and 3.

DESCRIPTION OF THE EMBODIMENTS

Figure 1:
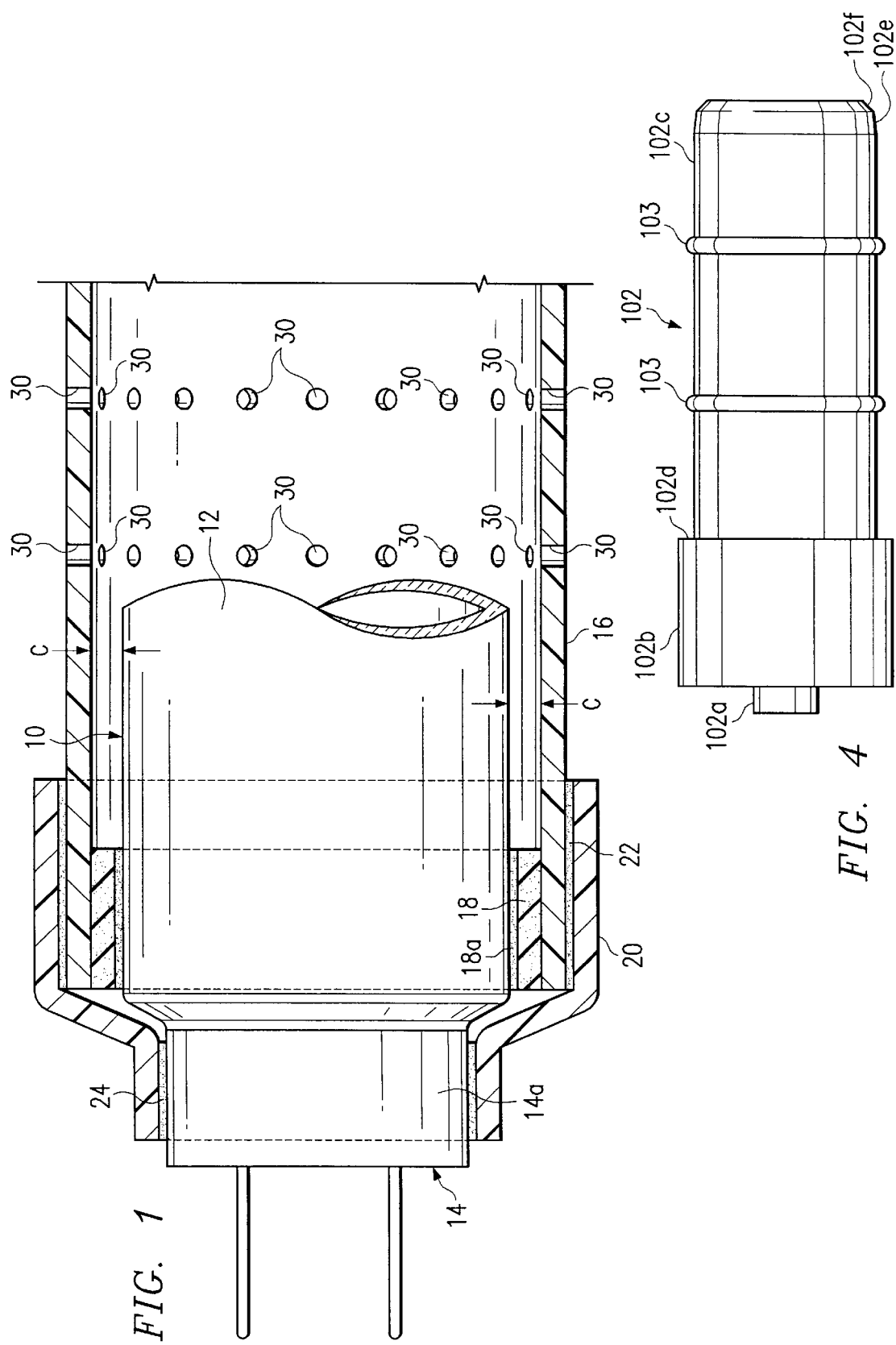
FIG. 1 is a side cross-sectional view of one end of a protective assembly as installed on a conventional fluorescent lamp and is also a mirror image of the other end, both ends being of the same construction.

Referring first to FIG. 1, reference numeral 10 designates a conventional, commercially available, room temperature fluorescent lamp of the type having an elongated glass tube 12 that necks down slightly at each end and is closed at each end by a metal cup-like terminal cap 14 having a peripheral flange portion 14a. The lamp bases may be of the conventional bi-pin (as shown), single pin or recessed double contact type. The protective assembly consists of a protective tube 16 preformed from a semi-rigid non-frangible transparent polymeric material that is received over the glass tube with a clearance "C" between the outer surface of the glass tube and the inner surface of the protective tube and extends lengthwise substantially coextensively with the glass tube. The clearance or gap "C" between the lamp tube and the protective tube is established and maintained by a spacer ring 18, there being a spacer ring 16 located adjacent each end of the glass tube. Each spacer ring is adhesively bonded to the glass tube by an adhesive layer 18a, is formed of a semi-rigid polymeric foam strip material that is resistant to heat and ultraviolet radiation, and is in the form of a band of substantially uniform rectangular cross section and having a thickness such that an outer surface of the ring forms a snug fit with an inner surface of the protective tube so that the protective tube can be slid lengthwise onto the lamp. A collar 20 preformed from a heat-shrinkable polymeric material is received in overlapping relation over a portion of the protective sleeve at each end thereof and over the flange portion of the adjacent cap. The collar 20 is heat-shrunk into sealed relation with the protective tube 16 and the cap flange portion 14a. A layer 22 of an adhesive is interposed between each collar 20 and the corresponding end of the protective tube 16, and an adhesive layer 24 is interposed between each collar 20 and the corresponding cap flange portion 14a. No adhesive is present between the glass tube of the lamp and the collars 20.

In a specific example of the invention, as applied to a 1.50 in. diameter fluorescent tube, the protective tube 16 is a piece cut to a length such as to extend lengthwise over the full diameter portion of the lamp tube (but not over the necked-down parts at either end) from an extrusion of a polycarbonate resin that is highly stabilized against ultraviolet radiation. The protective tube has a wall-thickness of 0.0625 inch and an inside diameter of 1$^{13}/_{16}$ inch. On the radius, the clearance or gap between the outside of the glass tube and the inside of the protective tube is $^3/_{32}$ inch.

To enable the protected lamp to operate properly without significant loss of light output at very low temperatures and without a reduced life or discoloring of the protective tube 16 near the ends where the lamp is hottest at moderately cool temperatures, vent holes 30 are provided in each end portion of the protective tube 16. In the embodiment all of the vent holes 30 are of the same diameter, 0.050 inch. It has been determined that holes of that size are small enough to prevent the escape of glass fragments from the glass tube and phosphor particles and mercury that are released from within the tube when the glass tube of the lamp breaks. The vent holes are evenly distributed circumferentially of the protective tube, thus avoiding possibly uneven venting action, depending on the orientation of the protected lamp. The number of holes required to keep the operating temperature of the lamp low enough to avoid problems at ambient temperatures as high as 50° F. is about 72 in each end portion of the protective tube. A suitable arrangement of the holes is three circumferential rows spaced apart about $^7/_{8}$th inch, and with the row closest to the end of the protective tube $^7/_{8}$th inch from the end of the protective tube.

To ensure uniformity of the diameters and lengths of the holes, all of the holes are formed by drilling and are aligned radially with respect to the longitudinal center axis of the tube 16. The apparatus of the present invention drills the vent holes 30 in the tube 16 rapidly and with high precision.

Figure 2:
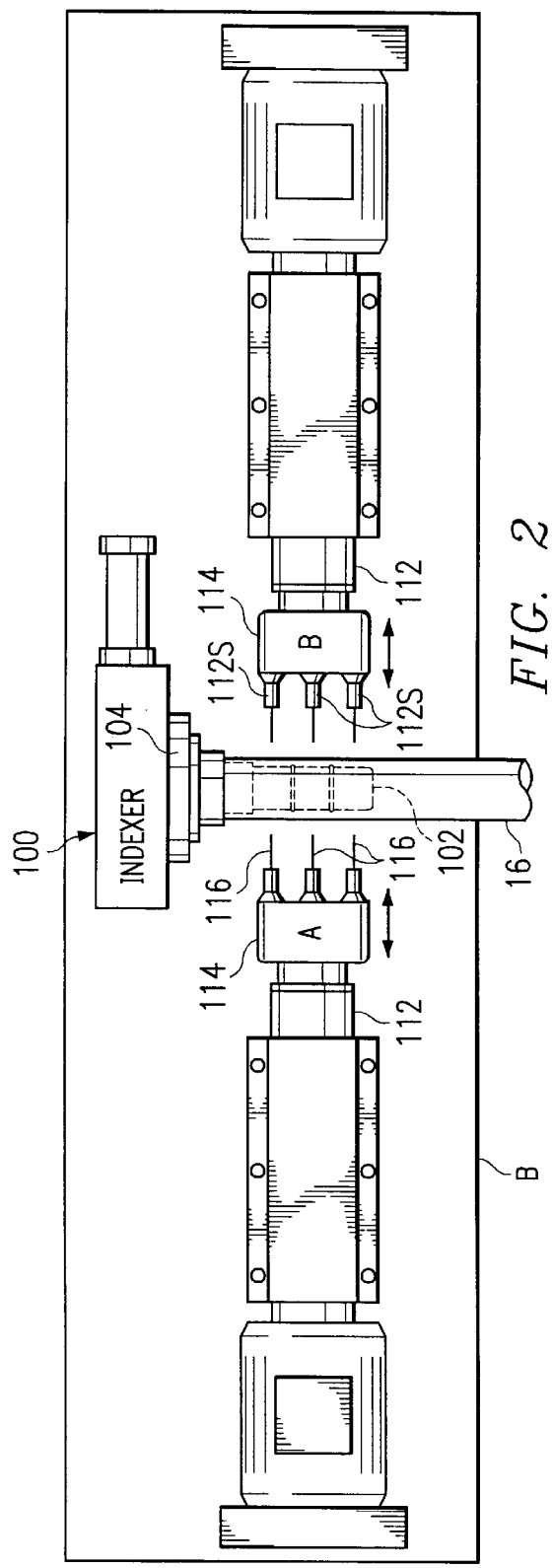
FIG. 2 is a top plan view of an embodiment of the apparatus according to the invention.
Figure 3:
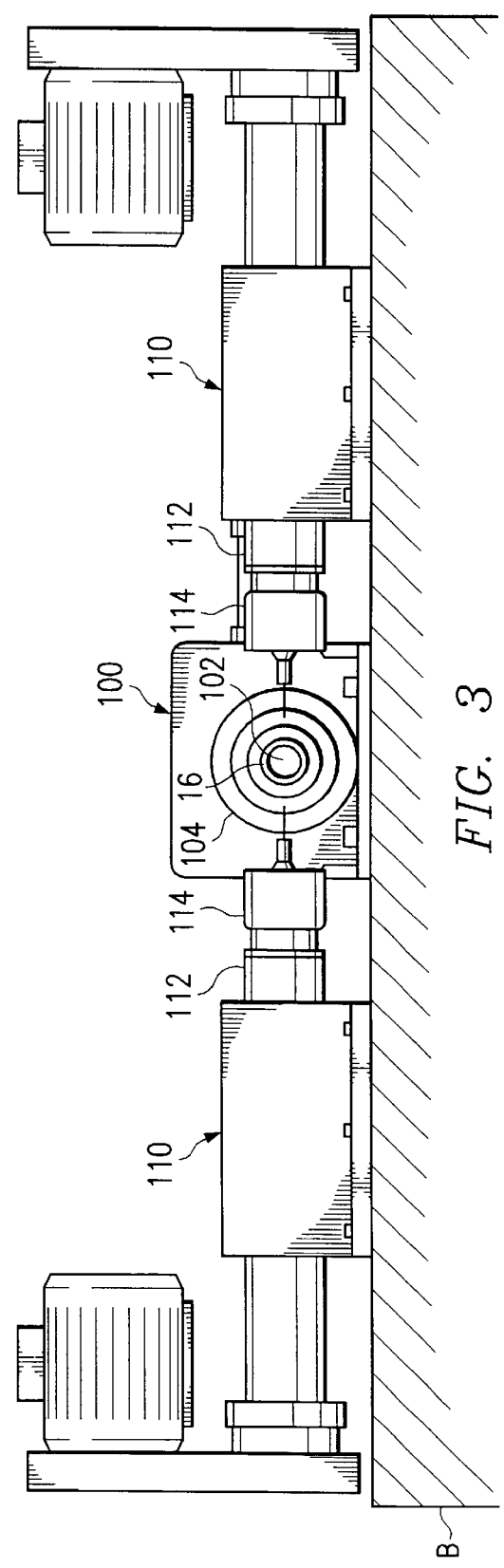
FIG. 3 is a side elevational view of the apparatus shown in FIG. 2.

The embodiment of the apparatus shown in FIGS. 2 to 4 includes a rotary index table 100, which is affixed to a bed B of the machine that is mounted on a stand (not shown). Suitable index tables are commercially available, such as Allenair Model #725 made by Allenair Corp. Of Mineola, N.Y.

A mandrel 102 is affixed to the rotary output element 104 of the index table 100 such that the mandrel rotates with the output element. As shown in FIG. 4, the mandrel 102 has a boss portion 102a by which it is affixed to the output element 104 of the index table, a base portion 102b that is of a diameter larger than the diameter of the tube 16, and a body portion 102c that is of a diameter slightly smaller than the inner diameter of the tube so as to accept the end portion of the tube 112 with a small clearance. Ring-grooves on the body portion 102c receive resilient O-rings 103 that are in interference fit with the inner surface of the tube 12 so as to hold the tube 12 by friction in a fixed position on the mandrel rotationally and axially. A stop shoulder 102d at the juncture between the base portion 102b and the body portion 102c of the mandrel 102 is engaged by the end of the tube. The distal end of the mandrel has a tapered portion 102e and a chamfer 102f, which facilitate guiding the end of the tube 12 onto the mandrel.

The inside diameters (ID's) of the tubes vary slightly, due to variations both in manufacturing conditions when the extruded tube stock is produced and in ambient conditions at the time when the holes are being drilled using the machine. For tubes having a relatively smaller ID, only one O-ring 103 need be used. For tubes having a relatively larger ID, both O-rings are installed, each providing a lesser friction force than in the case when one O-ring is used with smaller ID tubes but together providing the necessary friction force to hold the larger ID tubes on the mandrel.

A pair of identical self-feed drill units 110 are mounted on the bed B, symmetrically with respect to the mandrel, one unit 110 being mounted on one side of the mandrel and the other being mounted on the other side of the mandrel. The drill units may be Economaster PBM 13 units, which are made by Suhner Manufacturing, Inc., of Rome, Ga. Each unit 110 has a reciprocating output shaft 112 and is fitted with a multiple-spindle head 114, such as a three-spindle head that is also made by Suhner as model MH33/5. The drill units 110 are positioned with the axes of their output shafts 112 aligned with each other, lying in a plane that includes the axis of the mandrel 102, and oriented perpendicularly to the axis of the mandrel. Each head 114 is oriented on the output shaft 112 of the drill unit so that the axes of the three spindles 112s lie in the plane that includes the axis of the mandrel 102 and the axes of the output shafts 112. Each spindle receives a drill bit 116.

Under the control of a suitable controller (not shown), operation of the machine to drill the holes 30 in the tube 16 (see FIG. 1) is initiated by an operator after he or she places a tube 16 on the mandrel 102. The output shafts 112 of the drill units 110 are advanced toward the tube 16, thus drilling two sets, diametrically opposite each other on the tube, of three holes each in the tube, one set being drilled by each of the units 110. The drill units then retract, and the index table 100 rotates the mandrel, and therefore the tube 16, through a predetermined angle and then stops or dwells. During the dwell time, the drill units 110 advance and form two more sets of three holes each diametrically opposite each other and circumferentially spaced apart from the first two sets of holes. The sequence of drilling cycles and indexing is repeated until the desired number and pattern of holes 30 have been drilled in the tube 16, and the machine stops in a rest state. The operator removes the tube from the mandrel, reverses it end for end, places the undrilled end of the tube on the mandrel, and starts the machine running to drill holes 30 in the other end.

What is claimed is:

1. Apparatus for making numerous spaced-apart radially extending holes in a tube comprising a rotary index table that is adapted to be rotated intermittently through predetermined index angles of rotation about a table axis and to dwell between each rotation;

a mandrel affixed to the index table and adapted to be received telescopically within an end portion of the tube and hold the tube in a fixed position relative to the mandrel with the axis of the tube coaxial with the table axis;

a pair of self-feed drilling units mounted symmetrically on opposite sides of the mandrel, each in a fixed position relative to the index table, and having output shafts driven intermittently in reciprocating motion along axes lying in a common plane with the axis of the tube, the axis of each output shaft being perpendicular to the axis of the tube; and a multiple-spindle head carried by each of the output shafts of the drilling units, each spindle of the multiple-spindle head carrying a drill bit.

2. Apparatus according to claim 1 wherein the axes of the output shafts of the drilling units are aligned.

3. Apparatus according to claim 1 wherein both of the multiple-spindle heads have the same number of spindles.

4. Apparatus according to claim 2 wherein spindles are equally spaced apart.

5. Apparatus according to claim 1 wherein the axes of the output shafts of the drilling units are aligned and each of the multiple-spindle heads has three spindles.

6. Apparatus according to claim 1 wherein the axes of the output shafts of the drilling units are aligned and the multiple-spindle heads have the same number of spindles.

7. Apparatus according to claim 1 wherein the rotary index table is set up to rotate intermittently through the same index angle of rotation upon each increment of rotation and to dwell following rotation through each index angle, and each self-feed drilling unit is set up to cycle the output shaft thereof toward and away from the tube during each dwell of the index table.

8. Apparatus according to claim 1 wherein the mandrel is adapted to hold the tube in a fixed position by means of a resilient O-ring that is received in a ring-groove and forms an interference fit with the inner surface of the tube.

9. Apparatus according to claim 8 wherein the mandrel has a stop shoulder that is engaged by the end of the tube to position the tube longitudinally.

10. Apparatus according to claim 1 wherein the mandrel is adapted to hold the tube in a fixed position by means of a pair of axially spaced-apart resilient O-rings that are received in ring-grooves in the mandrel and form interference fits with the inner surface of the tube.

11. Apparatus according to claim 10 wherein the mandrel has a stop shoulder that is engaged by the end of the tube to position the tube longitudinally.

12. Apparatus for making numerous spaced-apart holes in a tube comprising rotary index table that is adapted to rotate intermittently through equal index angles of rotation about a table axis and to dwell between each rotation;

a mandrel affixed to the index table for rotation therewith, the mandrel being adapted to be received telescopically within an end portion of the tube, to hold the tube against movement relative to the mandrel by means of a resilient O-ring that is received in a ring-groove on the mandrel and forms an interference fit with the inner surface of the tube, and to position the tube longitudinally by means of a stop shoulder that is engaged by the end of the tube;

a pair of self-feed drilling units mounted symmetrically on opposite sides of the mandrel and having output shafts driven intermittently in reciprocating motion along a common axis lying perpendicular to the longitudinal axis of the tube, each drilling unit being set up to move the output shaft thereof through a cycle toward and away from the tube during each dwell of the index table; and a multiple-spindle head carried by each of the output shafts of the drilling units, each spindle of the multiple-spindle head carrying a drill bit.

13. Apparatus according to claim 12 wherein both of the multiple-spindle heads have the same number of spindles.

14. Apparatus according to claim 13 wherein the spindles are equally spaced apart.

15. Apparatus according to claim 14 wherein each of the multiple-spindle heads has three spindles.

* * * * *